(12) United States Patent
Nanjegowd et al.

(10) Patent No.: US 11,678,068 B2
(45) Date of Patent: Jun. 13, 2023

(54) GLARE REMOVAL USING DUAL CAMERAS (71) Applicant: Microsoft Technology Licensing, LLC, Redmond, WA (US)

(72) Inventors: Chandrasekhar Nanjegowd, Andhrapradesh (IN); Vivian Dsouza, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 114 days.

(21) Appl. No.: 17/360,844

(22) Filed: Jun. 28, 2021

(65) Prior Publication Data
US 2022/0385870 A1 Dec. 1, 2022

(30) Foreign Application Priority Data

May 31, 2021 (IN) ............................. 202141024176

(51) Int. Cl.
*G06T 7/90* (2017.01)
*H04N 5/20* (2006.01)
*H04N 9/09* (2006.01)
*H04N 5/33* (2006.01)
*H04N 9/73* (2023.01)
*H04N 9/64* (2023.01)
*G06T 7/11* (2017.01)
*H04N 5/225* (2006.01)
(Continued)

(52) U.S. Cl.
CPC .............. *H04N 9/735* (2013.01); *G06T 7/11* (2017.01); *G06T 7/90* (2017.01); *H04N 5/2258* (2013.01); *H04N 5/2351* (2013.01); *H04N 5/23229* (2013.01); *H04N 9/09* (2013.01); *H04N 9/646* (2013.01); *G06T 2207/10024* (2013.01); *G06T 2207/10048* (2013.01); *G06T 2207/20081* (2013.01); *G06T 2207/20084* (2013.01); *H04N 5/33* (2013.01)

(58) Field of Classification Search
CPC ........... G06T 7/90; G06T 7/97; H04N 5/2258; H04N 9/09; H04N 5/33
USPC ........................................................ 348/164
See application file for complete search history.

(56) References Cited

U.S. PATENT DOCUMENTS 8,730,356 B2 5/2014 Ansfield et al.
9,654,704 B2 5/2017 Holliday
(Continued)

FOREIGN PATENT DOCUMENTS

WO 2020237931 A1 12/2020

OTHER PUBLICATIONS

"How Computational Imaging and Machine Vision Work Together for Improved Image Processing", Retrieved From: https://www.automate.org/blogs/how-computational-imaging-and-machine-vision-work-together-for-improved-image-processing, Mar. 3, 2020, 4 Pages.
(Continued)

*Primary Examiner* — Jeffery A Williams
(74) *Attorney, Agent, or Firm* — Schwegman Lundberg & Woessner, P.A.

(57) ABSTRACT

Dual cameras that simultaneously capture RGB and IR images of a scene can be used to remove glare from the RGB image, transformed to a YUV image, by substituting a glare region in the luminance component of the YUV image with the pixel values in a corresponding region of the IR image. Further, color information in the glare region may be adjusted by averaging over or extrapolating from the color information in the surrounding region.

20 Claims, 4 Drawing Sheets

(51) Int. Cl.
*H04N 5/232* (2006.01)
*H04N 5/235* (2006.01)

(56) References Cited

U.S. PATENT DOCUMENTS

| | | | |
|---|---|---|---|
| 9,769,392 | B1 | 9/2017 | Colburn et al. |
| 10,713,520 | B2 | 7/2020 | Irrgang et al. |
| 10,825,157 | B2 | 11/2020 | Moussa |
| 2010/0290703 | A1 | 11/2010 | Zhang et al. |
| 2012/0106867 | A1* | 5/2012 | Yamada .................. G06T 5/008 382/274 |
| 2017/0330053 | A1 | 11/2017 | Park et al. |
| 2019/0102872 | A1 | 4/2019 | Moussa |
| 2021/0044736 | A1 | 2/2021 | Kaneko |

OTHER PUBLICATIONS

"Visible Infrared Imaging Radiometer Suite (VIIRS)", Retrieved From: https://earthdata.nasa.gov/earth-observation-data/near-real-time/download-nrt-data/viirs-nrt#ed-corrected-reflectance, Retrieved on Sep. 22, 2020, 8 Pages.

An, et al., "Infrared and Visible image Fusion with Supervised Convolutional Neural Network", In Proceedings of Optik, International Journal for Light and Electron Optics, vol. 219, Oct. 2020, 12 Pages.

Edgar,. et al., "Simultaneous Real-Time Visible and Infrared Video with Single-Pixel Detectors", In Proceedings of Science Reports, May 2015, 8 Pages.

Fang, et al., "A Robust Non-Linear and Feature-Selection Image Fusion Theory", Retrieved From https://arxiv.org/pdf/1912.10738v1.pdf, Dec. 2019, 25 Pages.

Fang, et al., "Non-linear and Selective Fusion of Cross-Modal Images", Retrieved From https://arxiv.org/pdf/1912.10738.pdf, Jun. 2020, 38 Pages.

Goudeseune, Camille, "Map R+G+B+infrared to R+G+B?", Retrieved From: https://web.archive.org/web/20150329091225/https://photo.stackexchange.com/questions/54766/map-rgbinfrared-to-rgb, Mar. 29, 2015, 2 Pages.

Keresztes, et al., "Real-Time Pixel based Early Apple Bruise Detection using Short Wave Infrared Hyperspectral Imaging in Combination with Calibration and Glare Correction Techniques", In Proceedings of Food Control, vol. 66,, Aug. 2016, pp. 215-226.

Liu, et al., "Infrared and Visible Image Fusion with Convolutional Neural Networks", In International Journal of Wavelets Multiresolution and Information Processing, vol. 16, issue 3, Jan. 9, 2018, 20 Pages.

Salamati, et al., "Removing Shadows from Images using Color and Near-Infrared", In Proceedings of IEEE International Conference on Image Processing, Sep. 2011, pp. 1753-1756.

Tang et al., "High Resolution Photography with an RGB-Infrared Camera", In Proceedings of IEEE International Conference on Computational Photography, Apr. 2015, 10 Pages.

Tran, Tho Duc, "ducthotran2010 / glare-reduction", Retrieved From: https://github.com/ducthotran2010/glare-reduction, Aug. 3, 2019, 4 Pages.

Tretter, et al., "Multispectral Image Coding", Retrieved From https://engineering.purdue.edu/~bouman/publications/pdf/multispec.pdf, Retrieved on Sep. 22, 2020, 22 Pages.

Wang, et al., "Cross-Modality Paired-Images Generation for RGB-Infrared Person Re-Identification", In Proceedings of the AAAI Conference on Artificial Intelligence, vol. 34, Issue 07, Apr. 2020, pp. 12144-12151.

"Color and IR Camera or Multispectral Camera with RGB and NIR Bands", Retrieved From: https://www.bing.com/videos/search?q=remove+glare+from+RGB+image+with+infrared+camera+%22two+different+cameras%22&docid=608001420247529824&mid=9CAC1AA6F16B4B5018D59CAC1AA6F16B4B5018D5&view=detail&FORM=VIRE, Aug. 8, 2019, 3 Pages.

Honovich, John, "How to Handle Headlight Surveillance Problems", Retrieved From: https://ipvm.com/reports/headlights-harm-video-surveillance, May 17, 2011, 15 Pages.

"International Search Report and Written Opinion Issued in PCT Application No. PCT/US22/027741", dated Aug. 18, 2022, 11 Pages.

Wang, et al., "Detection and Inpainting of Specular Reflection in Colposcopic Images with Exemplar-based Method", In Proceedings of the IEEE 13th International Conference on Anti-counterfeiting, Security, and Identification, Oct. 25, 2019, pp. 90-94.

\* cited by examiner

GLARE REMOVAL USING DUAL CAMERAS

CLAIM OF PRIORITY

The present patent application claims the priority benefit of the filing date of Indian Application No. 202141024176 filed May 31, 2021, the entire content of which is incorporated herein by reference.

BACKGROUND

When a camera is used to capture video or take a photo, any presence of an active light source or high-intensity specular reflection from an object in the scene can cause an over-exposed region, called glare, which results in distortion of pixels and loss of detail in the image(s). One approach to addressing this problem involves taking images of the scene from two or more different perspectives, and post-processing the images to create a composite image from which the glare is removed, taking advantage of the fact that the glare caused by a given light source or specular reflection will occur at different locations in the images. The different images may be taken simultaneously with multiple cameras. Alternatively, if the image is to be taken of a still scene or object, the images may be taken sequentially with the same camera, moved to different locations and/or orientations relative to the scene. In a variation of this approach, it is also possible, in some application contexts, to take multiple images with the same camera perspective, but with the scene under illumination from different angles. Solutions that rely on sequentially taken images are generally inapplicable to glare removal from video of moving objects. Even if multiple cameras are used to image the scene from multiple angles simultaneously, the subsequent image processing is computationally expensive, which severely limits its feasibility for glare removal in real-time applications.

BRIEF DESCRIPTION OF THE DRAWINGS

Various systems and methods for glare removal from images are described herein with reference to the accompanying drawings, in which.

DESCRIPTION

Described herein are systems and methods to automatically remove glare from images captured with an RGB camera based on images simultaneously acquired with an IR camera. The disclosed approach exploits the fact that IR cameras do not capture light in the visible spectrum, and the IR images, therefore, do not include glare. A system for glare removal in accordance with various embodiment includes dual RGB and IR cameras that overlap in their respective fields of view and can be operated to simultaneously capture a pair of images of a scene, with associated electronic circuitry that processes the raw image data read out from the image sensors of the RGB and IR cameras to generate output images having the same field of view and the same resolution. Further, the system includes computing hardware and/or software that, after conversion of the RGB image to YUV format, processes the Y plane of the YUV image to detect any glare present in the image and identify its contours, which define the "glare region of interest (glare ROI)" or simply "glare region;" substitutes the glare ROI in the Y plane with the pixel values of a corresponding region in the IR image to remove the glare artifact; and (optionally) adjusts the color information of the pixels in the glare ROI based on the UV planes of the original YUV image. For example, the color information in the pixels surrounding the glare region can be averaged or extrapolated to determine the color information within the glare region. Alternatively, in some instances, the original UV plane values may be used as is.

The proposed approach lends itself to computationally efficient implementations that facilitate glare removal in real time, e.g., within 30 ms or less. Accordingly, glare removal in accordance herewith can be applied to video streams, for instance, to improve the user experience during video calls or video recording under various lighting conditions, or to improve the video provided by dashboard and other vehicle camera systems, to name just a couple of examples.

Figure 1:
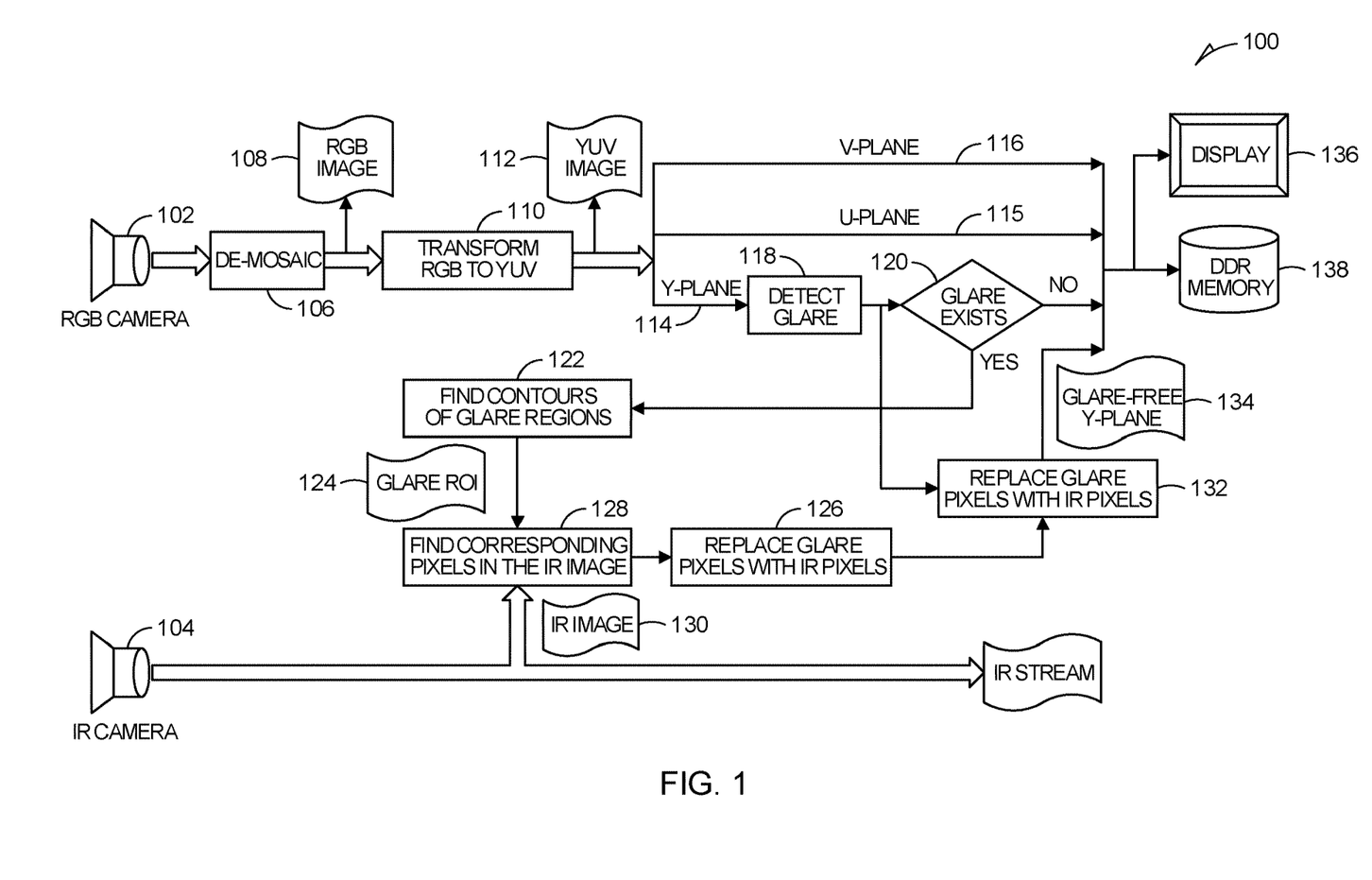
FIG. 1 is a flow diagram illustrating a method for generating glare-free images based on pairs of red-green-blue (RGB) and infrared (IR) images, in accordance with various embodiments.

FIG. 1 is a flow diagram illustrating a method 100 for generating glare-free images based on pairs of RGB and IR images, in accordance with various embodiments. Two digital cameras, an RGB camera 102 capturing light in the visible wavelength range and an IR camera 104 capturing light in the infrared wavelength range, simultaneously acquire a pair of images of a scene. The pair of images may be, e.g., synchronized frames within video streams produced by the cameras 102, 104. The RGB camera 102 may include an image sensor overlaid with a color filter array (CFA); in this case, the image processing pipeline involves "de-mosaicing" the sensor output (act 106), that is, digitally processing it based on the CFA to construct a full color image, or RGB image, 108. The RGB image 108 is further transformed (in act 110) to a YUV image 112, which represents the image in terms of a luminance (physical brightness) component Y (114) and two chrominance components U (blue projection) and V (red projection) (115 and 116).

Glare removal operates on the Y component, or Y plane 114, of the YUV image 112. As shown, the method 100 involves determining whether glare exists in the Y plane 114 (act 118), and if so (as decided at 120), identifying the contours of the glare region (act 122). Glare detection can generally be performed either by traditional, explicit image processing algorithms, or by machine learning models. Traditional algorithms usually rely on statistically defined thresholds and blob sizes to classify an image region as glare or not glare. Often, these algorithms identify glare regions of certain pre-defined shapes (e.g., circle, square, rectangle), which limits detection accuracy and can result in both false negatives (missed glare regions) and false positives (non-glare regions erroneously classified as glare). With machine learning models, the threshold and blob sizes are not statistically predefined, but tuned automatically based on the data. In addition, certain parameters of the machine learning model can be fine-tuned based on additional data even after deployment. In an example embodiment, a convolutional neural network (CNN) is employed to determine which pixels within the image are within the glare region. Note that, although glare detection and identification of the glare region are conceptually depicted in FIG. 1 as two separate steps 118, 122, they may, in some embodiments, constitute a single operation that identifies any glare region(s), thereby inherently determining whether glare exists in the images.

Once the glare ROI 124 has been identified within the Y plane 114 of the YUV image 112, a corresponding region of pixels 126 is identified (in act 128) in the IR image 130. For computational simplicity, the determination of corresponding pixels is generally performed on a pair of an RGB/YUV image 108/112 and an IR image 130 that have been pre-processed, e.g., using spatial transformation and cropping, to share a common field of view and the same resolution. The pixels values in the glare region 124 of the Y plane are then replaced with the pixel values of the corresponding region 126 within the IR image 130 (act 132), resulting in a glare-free Y-plane 134. Further, the corrected, glare-free Y plane 134 is recombined with the chrominance components, that is, the UV planes 115, 116. In some embodiments, the color information within the glare ROI is adjusted based on the color values surrounding the glare ROI, taking advantage of the fact that color tends to be highly correlated (with neighboring pixels often having the same color value). For example, for glare regions including relatively few contiguous pixels, the UV pixel values within the glare region of the YUV image may be replaced by an average over UV pixel values of pixels surrounding the glare region (e.g., a weighted average, with weights being larger for pixels from the surroundings that are closer to a given pixel in the glare region). For larger glare regions, the UV planes may be fitted in the areas surrounding the glare region and extrapolated into the glare region. The glare-free image composed of the luminance information of the glare-free Y plane 134 and the chrominance information of the (e.g., color-adjusted) UV planes 115, 116 may be sent to a display device 136 (e.g., a computer screen, phone screen, or video display screen in a vehicle) and/or stored in memory 138. If no glare is detected in the Y plane (as determined at 120), the Y plane 114 and the UV planes 115, 116 are used as is in the stored or displayed image.

Figure 2:
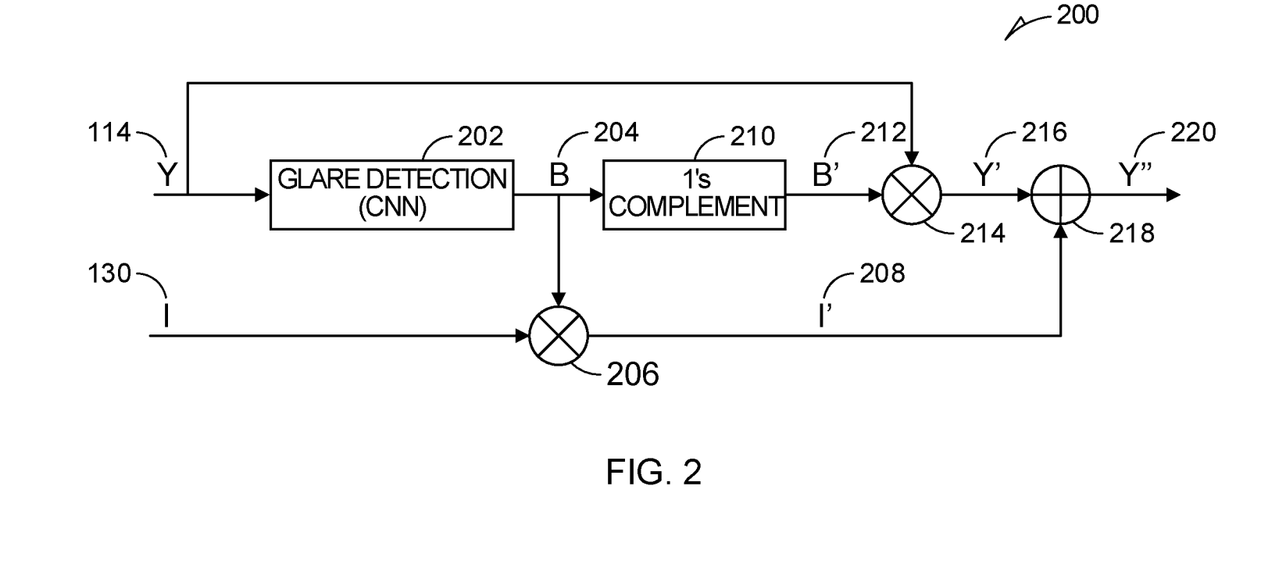
FIG. 2 is a schematic depiction of an image processing method for glare removal from an RGB image using an IR image, as may be employed in the method of FIG. 1, in accordance with various embodiments.

FIG. 2 is a schematic depiction of an image processing method 200 for glare removal from an RGB image using an IR image, as may be employed in the method 100 of FIG. 1, in accordance with various embodiments. The Y plane 114 from the RGB camera is input to a glare detection algorithm 202 that classifies every pixel as either a glare pixel or a normal pixel, creating a binary bit map (B) 204 where each glare pixel takes a value of one and each normal pixel takes a value of zero. As will be appreciated, the bit map 204 both reflects whether there is any glare in the image, and if there is, inherently defines the glare region. Thus, the glare detection algorithm 202 combines glare detection and identification of the glare region and its contours in one step.

The glare detection algorithm 202 may be explicitly programmed, or implemented by a machine learning model. In the latter case, the machine learning model may be, for instance, a neural network model such as a CNN or a fully connected network. CNNs, which are generally well-suited for image processing tasks, are particularly beneficial to implement the glare detection algorithm 202 in that they can provide high accuracy and performance. Neural network models for glare detection can be trained, e.g., in a supervised manner based on training data that includes many pairs of a Y plane and its corresponding binary bit map, with bit maps generated, e.g., manually by a user identifying the glare region contours in the image. As is known in the art, training the neural network involves iteratively adjusting network weights to optimize a cost function measuring the discrepancy between the output of the model (in this case, a binary bit map) and the ground-truth output provided with the training data (e.g., the manually generated binary bit map); a widely used algorithm for this optimization is backpropagation of errors.

Once the binary bit map 204, which inherently identifies the glare region in the Y plane of the YUV image, has been generated, the corresponding region in the IR image (I) 130 can be identified by multiplying the IR image, at 206, with the binary bit map 204. This operation generates an intermediate image (I') 208 in which all pixel values except in the glare region are zero. In the glare region, the intermediate image 208 has the same pixel values as the IR image 130 from which it is computed. Further, in act 210, the binary bit map 204 is inverted by forming its 1's complement (B') 212, which is zero for all pixels within the glare region and one for all pixels outside the glare region. The Y plane 114 of the YUV image is multiplied, at 214, with the 1's complement 212 of the binary bit map 204. This operation generates another intermediate image (Y') 216, in which pixel values corresponding to the glare region become zero. The two intermediate images 208, 216 are added, at 218, to generate a single modified Y plane (Y") 220 free of glare pixels, in which the glare pixels of the original Y plane 114 have been substituted by corresponding pixel values of the IR image 130.

The method 200, in an efficient implementation, can be computationally fast, allowing glare to be removed from an RGB image stream in real time, that is, within a timeframe that is unnoticeable to a human consumer of a video stream. For example, video captured at a frame rate of thirty frames per second (or more), corresponding to a new video frame every 33 milliseconds, is perceived by humans as continuous video. In various embodiments, the glare removal process is completed within less than 33 milliseconds, which enables producing glare-free video frames at the rate at which raw video frames are acquired.

Figure 3:
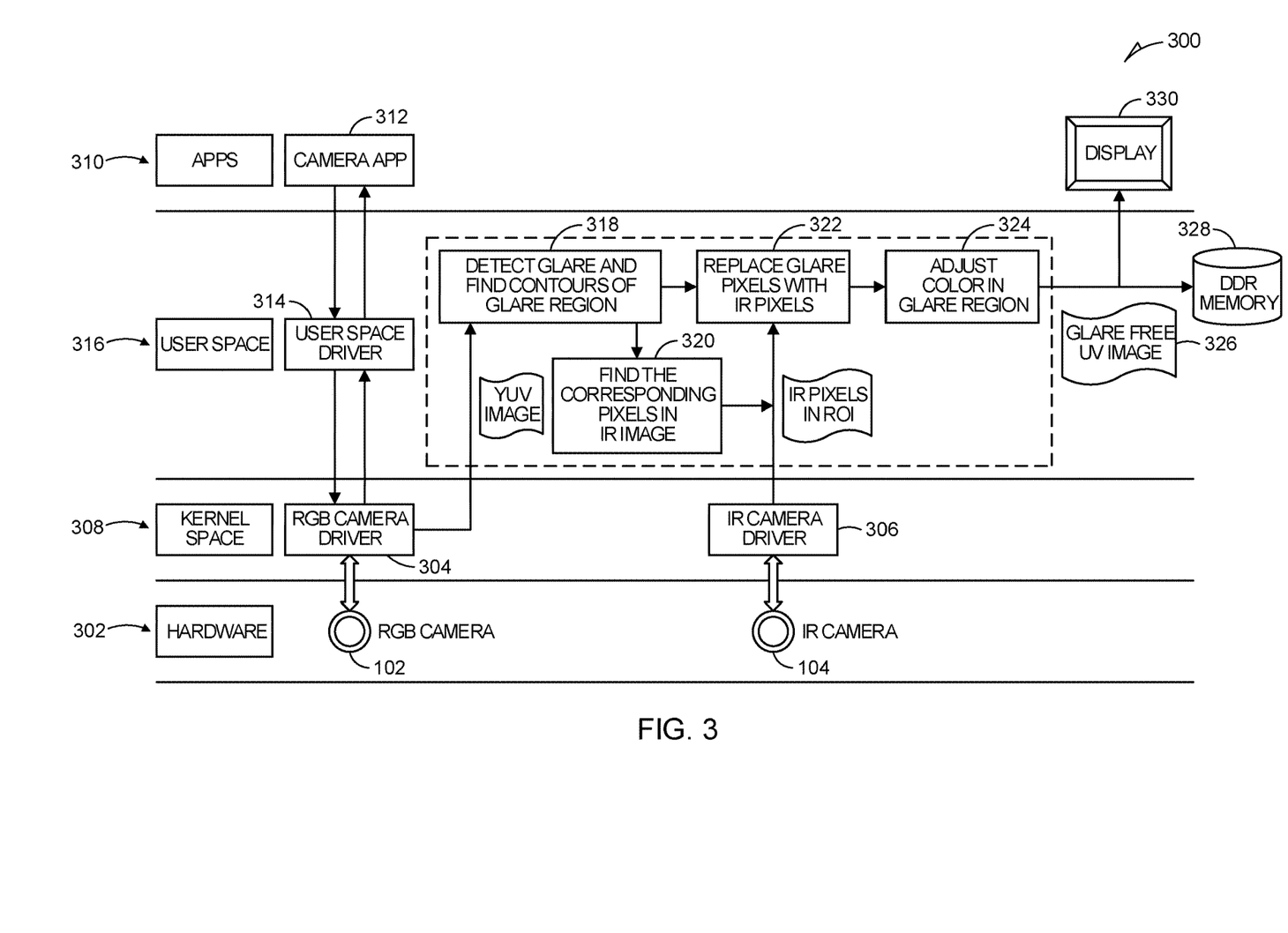
FIG. 3 is a schematic diagram illustrating a system architecture for generating glare-free images in accordance with various embodiments.

FIG. 3 is a schematic diagram illustrating a system architecture for generating glare-free images in accordance with various embodiments. The system 300 may be implemented by a computing machine, e.g., as depicted schematically in FIG. 4, that includes one or more hardware processors (e.g., one or more central processing units (CPUs) and/or graphic processing units (GPUs)), memory storing program instructions for execution by the processor(s) (including an operating system and one or more software applications), and various peripheral hardware devices, including, e.g., user input/output devices (such as a keyboard or touchpad, display device, or touch screen) and cameras. The computing machine may be, for example and without limitation, a personal desktop or laptop computer, tablet, or smartphone.

At the hardware level 302, the system 300 includes an RGB camera 102 and an IR camera 104. The cameras 102, 104 generally have an associated digital signal processor (DSP), more specifically an image signal processor (ISP), that pre-processes the image sensor signals, e.g., to perform the de-mosaicing of RGB images, noise reduction, and the like. In dual-camera systems, pre-processing may also involve the image transformation and cropping operations used to create a pair of images with the same resolution and field of view. The cameras 102, 104 have respective associated camera device drivers 304, 306, which generally run in the kernel space 308 of the operating system. At the application level 310, the system 300 runs a software application 312 that provides video capabilities via access to the RGB camera 102; hereinafter, such an application is also referred to as a camera application 312. The camera application 312 may, for instance, be an online collaboration platform, such as Microsoft® Teams, that enables video calls. As another example, the camera application 312 may be a special smartphone app dedicated to taking pictures and recording video. The camera application 312 communicates with a user space driver 314 in the user space 316 of the operating system. The user space driver 314, in turn, communicates with the camera device drivers 304, 306.

In the depicted example, glare removal is implemented in the user space 316. That is, the user space driver 314 includes processing components, operating on pre-processed YUV and IR images received from the RGB and IR camera drivers 304, 306, to detect and find the contours of any glare region(s) in the Y plane of the YUV image (driver component 318) and find the corresponding pixels in the IR image (driver component 320), replace the glare pixel values in the Y plane with the corresponding IR pixel values (driver component 322), and adjust the color information of the substituted pixels based on chrominance components of the YUV image in the glare region (driver component 324). The glare-free, color-adjusted YUV image 326 can then be stored in memory 328 (e.g., double data rate (DDR) random-access memory) allocated to the camera application 312, and/or output, by the camera application 312, to a hardware display device 330.

As will be readily appreciated by those of ordinary skill in the art, the glare removal functionality can generally be implemented both in the user space 316 or, alternatively, in the kernel space 308. Implementation as part of the user space driver 314, as illustrated in FIG. 3, is beneficial in that it insulates the kernel space 308 from any errors that may occur during glare removal, and thus avoids the need for a system restart or reloading of the camera device drivers 304, 306 in case of an error.

It is also possible, in an alternative embodiment, to provide for glare removal at the hardware level 302 in an ISP, e.g., as part of a system-on-chip (SoC) for a dual-camera system. For example, various existing dual-camera systems already perform image alignment between two images in the ISP (to obtain images having a shared field of view). For example, the Snapdragon™ SoC from Qualcomm® has an on-chip ISP, Spectra 580, which supports dual-camera systems. The Exynos® SoC from Samsung® also supports dual camera systems. In accordance with various embodiments, these and similar systems, if used with RGB and IR cameras, may be enhanced by further processing the images in the ISP to remove glare from the RGB images.

In yet another embodiment, glare removal as described herein (e.g., with reference to FIG. 2) may be implemented in software at the application level 310. This approach allows for the use of two individual cameras (one RGB and one IR camera), in place of a combined dual-camera system. Image processing software may receive raw YUV and IR data from the two cameras, and process them as needed to achieve the same resolution and a common field of view. For example, the image processing software may utilize image registration techniques to identify corresponding pixels in the two images. The image-processing method 200 for glare removal may then be applied to the properly aligned images.

Software implementation in principle also enables remote, cloud-based glare removal. For example, images from the RGB and IR cameras of a device connected to the Internet via a suitable wired or wireless communication channel may be sent to a remote server computer for glare removal, and the server may then return the processed, glare-free image. Such remote glare removal can be used when post-processing images, absent stringent time constraints. When processing video streams in real time, remote processing is feasible if communication rates are sufficient for real-time image transfer back and forth between the camera-equipped device and the server computer.

Figure 4:
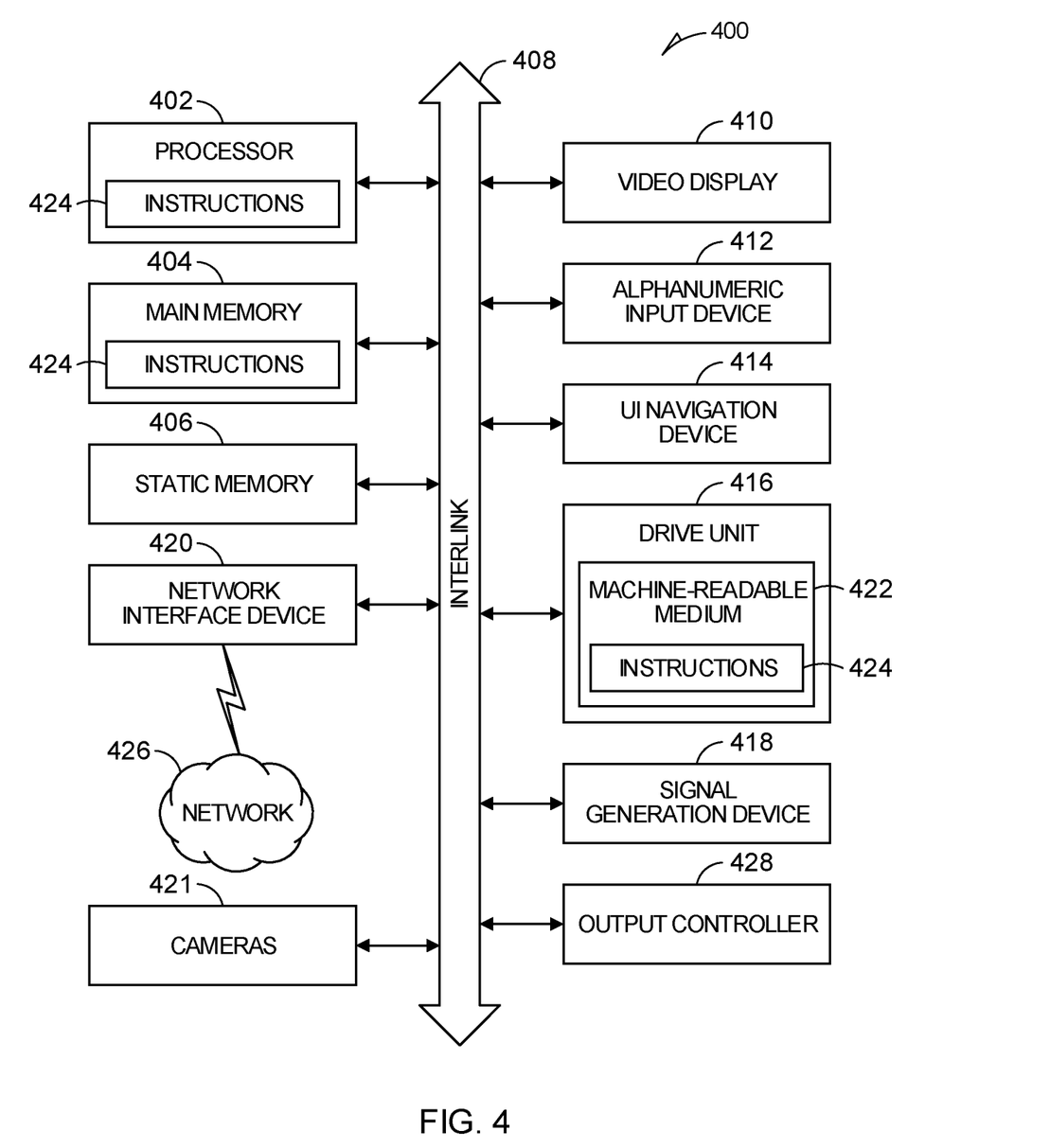
FIG. 4 is a block diagram of an example machine with which glare removal in accordance with various embodiments may be performed.

FIG. 4 is a block diagram of an example machine 400 with which glare removal in accordance with various embodiments may be performed. The machine may implement, in whole or in part, the method 100, including the example image processing method 200, and may form all or part of the system 300. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a smartphone, a web appliance, a network router, switch or bridge, a server computer, a database, conference room equipment, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), and a network interface device 420. Further, the machine 400 includes two or more cameras 421 to acquire still images or video. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine-readable medium 422 on which are stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine-readable media.

While the machine-readable medium 422 is illustrated as a single medium, the term "machine-readable medium" may include a single medium or multiple media (e.g., a centralized or distributed database, and/or associated caches and servers) configured to store the one or more instructions 424.

The term "machine-readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine-readable media are non-transitory machine readable media. In particular, in some examples, machine-readable media are media other than transitory propagating signals.

The instructions 424 may further be transmitted or received over a communications network 426 using a transmission medium via the network interface device 420. The machine 400 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. In some examples, the network interface device 420 may wirelessly communicate using Multiple User MIMO techniques.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The following numbered examples are illustrative embodiments.

Example 1. A method for generating a glare-free image includes acquiring an RGB image of a scene in a visible wavelength range, acquiring an infrared (IR) image of the scene in an IR wavelength range, and processing the RGB image in conjunction with the IR image. As part of the processing, the RGB is transformed to a YUV image. Based on a luminance component of the YUV image, a glare region is identified in the YUV image, and then a region corresponding to the glare region in the YUV image is identified in the IR image. In the luminance component of the YUV image, pixel values in the glare region are substituted with pixel values of the corresponding region in the IR image. The result is a glare-free image. Beneficially, using an IR image in this manner to remove glare from an RGB image is computationally low-cost, which saves hardware resources and enables fast processing times, including, in some embodiments, real-time processing.

Example 2. The method of example 1 may be enhanced by adjusting, in a chrominance component of the YUV image, pixel values in the glare region based on pixel values in a region surrounding the glare region.

Example 3. In the method of example 1 or example 2, identifying the glare region based on the luminance component of the YUV image may include generating a binary bit map indicating for each pixel in the YUV image whether it is a glare pixel.

Example 4. In the method of example 3, the bitmap may be generated with a machine learning model. Beneficially, with a machine learning model, a pixel-value threshold and blob sizes of the glare region are not predefined, but can be tuned automatically based on data, and fine-tuned based on additional data even after deployment. This flexibility and data-driven optimization of the model helps achieve high accuracy of the glare, no-glare classification.

Example 5. In the method of example 4, the machine learning model may include a convolutional neural network (CNN). CNNs are highly suited for image-processing applications, and may result in particularly high performance.

Example 6. In the method of any of examples 3-5, the region in the IR image corresponding to the glare region in the YUV image may be identified by multiplying the IR image with the binary bit map to create a first intermediate image.

Example 7. In the method of example 6, the pixel values in the glare region in the luminance component of the YUV image may be substituted by the pixel values of the corresponding region in the IR image by multiplying the luminance component of the YUV image with a complement of the binary bit map to create a second intermediate image, and adding the first and second intermediate images to create the glare-free image.

Example 8. In the method of any of the preceding examples, the RGB and IR images may be synchronous frames of first and second video streams captured with an RGB camera and an IR camera, respectively.

Example 9. In the method of example 8, glare-free images may be generated from additional synchronous frames of the first and second video streams in real time.

Example 10. In the method of any of the preceding examples, the glare-free image may be displayed on a display device.

Example 11. A system for generating a glare-free image includes one or more hardware processors for processing an RGB image of a scene in a visible wavelength range in conjunction with an infrared (IR) image of the scene in an IR wavelength range. The processing operations include transforming the RGB image to a YUV image; based on a luminance component of the YUV image, identifying a glare region in the YUV image; identifying, in the IR image, a corresponding region to the glare region in the YUV image; and substituting, in the luminance component of the YUV image, pixel values in the glare region with pixel values of the corresponding region in the IR image. The system outputs a glare-free image, and may facilitate real-time glare removal.

Example 12. A system as in example 11 may further include an RGB camera configured to acquire the IR image and an IR camera configured to acquire the IR image.

Example 13. In the system of example 11 or example 12, the processing operations may further include adjusting, in a chrominance component of the YUV image, pixel values in the glare region based on pixel values in a region surrounding the glare region.

Example 14. In the system of any of examples 11-13, the one or more hardware processors may include one or more general-purpose processors configured by instructions stored in memory to perform the processing operations.

Example 15. In the system of example 14, the instructions may be part of a user space driver associated with RGB and IR cameras and executed within a user space of an operating system.

Example 16. In the system of any of examples 11-13, the one or more hardware processors may include a hardware-implemented image signal processor associated with the RGB and IR cameras.

Example 17. One or more machine-readable media store processor-executable instructions for processing pairs of synchronously acquired YUV and IR images to generate a glare-free image. The instructions, when executed by a hardware processor, cause the hardware processor to perform the following operations: based on a luminance component of the YUV image, identifying a glare region in the YUV image; identifying, in the IR image, a corresponding region to the glare region in the YUV image; and substituting, in the luminance component of the YUV image, pixel values in the glare region with pixel values of the corresponding region in the IR image.

Example 18. In the one or more machine-readable media of example 17, the operations may further include adjusting, in a chrominance component of the YUV image, pixel values in the glare region based on pixel values in a region surrounding the glare region.

Example 19. In the one or more machine-readable media of claim 17 or claim 18, the glare region may be identified based on the luminance component of the YUV image by generating a binary bit map indicating for each pixel in the YUV image whether it is a glare pixel, the corresponding region in the IR image may be identified by multiplying the IR image with the binary bit map to create a first intermediate image, and the pixel values in the glare region in the luminance component of the YUV image may be substituted with the pixel values of the corresponding region in the IR image by multiplying the luminance component of the YUV image with a complement of the binary bit map to create a second intermediate image, and adding the first and second intermediate images to create the glare-free image.

Example 20. In the one or more machine-readable media of example 19, the bitmap may be generated with a machine learning model that includes, e.g., a convolutional neural network (CNN).

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings, which form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

The invention claimed is:

1. A method for generating a glare-free image, the method comprising:
    acquiring an RGB image of a scene in a visible wavelength range;
    acquiring an infrared (IR) image of the scene in an IR wavelength range;
    transforming the RGB image to a YUV image;
    based on a luminance component of the YUV image, identifying a glare region in the YUV image;
    identifying, in the IR image, a corresponding region to the glare region in the YUV image; and
    substituting, in the luminance component of the YUV image, pixel values in the glare region with pixel values of the corresponding region in the IR image.

2. The method of claim 1, further comprising:
    adjusting, in a chrominance component of the YUV image, pixel values in the glare region based on pixel values in a region surrounding the glare region.

3. The method of claim 1, wherein identifying the glare region based on the luminance component of the YUV image comprises generating a binary bit map indicating for each pixel in the YUV image whether it is a glare pixel.

4. The method of claim 3, wherein the bitmap is generated with a machine learning model.

5. The method of claim 4, wherein the machine learning model comprises a convolutional neural network (CNN).

6. The method of claim 3, wherein identifying the corresponding region in the IR image comprises multiplying the IR image with the binary bit map to create a first intermediate image.

7. The method of claim 6, wherein substituting the pixel values in the glare region in the luminance component of the YUV image with the pixel values of the corresponding region in the IR image comprises multiplying the luminance component of the YUV image with a complement of the binary bit map to create a second intermediate image, and adding the first and second intermediate images to create the glare-free image.

8. The method of claim 1, wherein the RGB image is a frame of a first video stream captured with an RGB camera and the IR image is a synchronous frame of a second video stream captured with an IR camera.

9. The method of claim 8, further comprising generating glare-free images from additional synchronous frames of the first and second video streams in real time.

10. The method of claim 1, further comprising displaying the glare-free image on a display device.

11. A system for generating a glare-free image, comprising:
one or more hardware processors for processing an RGB image of a scene in a visible wavelength range in conjunction with an infrared (IR) image of the scene in an IR wavelength range by performing operations comprising:
transforming the RGB image to a YUV image;
based on a luminance component of the YUV image, identifying a glare region in the YUV image;
identifying, in the IR image, a corresponding region to the glare region in the YUV image; and
substituting, in the luminance component of the YUV image, pixel values in the glare region with pixel values of the corresponding region in the IR image.

12. The system of claim 11, further comprising:
an RGB camera configured to acquire the IR image; and
an IR camera configured to acquire the IR image.

13. The system of claim 11, wherein the operations further comprise:
adjusting, in a chrominance component of the YUV image, pixel values in the glare region based on pixel values in a region surrounding the glare region.

14. The system of claim 11, wherein the one or more hardware processors comprise one or more general-purpose processors configured by instructions stored in memory to perform the operations.

15. The system of claim 14, wherein the instructions are part of a user space driver associated with the RGB and IR cameras and executed within a user space of an operating system.

16. The system of claim 11, wherein the one or more hardware processors comprise a hardware-implemented image signal processor associated with a RGB and IR cameras configured to acquire the RGB and IR images.

17. One or more machine-readable media storing processor-executable instructions for processing pairs of synchronously acquired YUV and IR images to generate a glare-free image, the instructions, when executed by a hardware processor, causing the hardware processor to perform operations comprising:
based on a luminance component of the YUV image, identifying a glare region in the YUV image;
identifying, in the IR image, a corresponding region to the glare region in the YUV image; and
substituting, in the luminance component of the YUV image, pixel values in the glare region with pixel values of the corresponding region in the IR image.

18. The one or more machine-readable media of claim 17, wherein the operations further comprise:
adjusting, in a chrominance component of the YUV image, pixel values in the glare region based on pixel values in a region surrounding the glare region.

19. The one or more machine-readable media of claim 17, wherein identifying the glare region based on the luminance component of the YUV image comprises generating a binary bit map indicating for each pixel in the YUV image whether it is a glare pixel, wherein identifying the corresponding region in the IR image comprises multiplying the IR image with the binary bit map to create a first intermediate image, and wherein substituting the pixel values of the glare region in the luminance component of the YUV image with the pixel values of the corresponding region in the IR image comprises multiplying the luminance component of the YUV image with a complement of the binary bit map to create a second intermediate image, and adding the first and second intermediate images to create the glare-free image.

20. The one or more machine-readable media of claim 19, wherein the bitmap is generated with a machine learning model comprises a convolutional neural network (CNN).

\* \* \* \* \*